US009692298B2

United States Patent
Pregitzer et al.

(10) Patent No.: US 9,692,298 B2
(45) Date of Patent: Jun. 27, 2017

(54) POWER CONVERTER CONTROLLER WITH INPUT CURRENT SLOPE ADJUSTMENT

(71) Applicant: Power Integrations, Inc., San Jose, CA (US)

(72) Inventors: Ricardo Luis Janezic Pregitzer, Campbell, CA (US); Mingming Mao, Saratoga, CA (US); Tiziano Pastore, Los Gatos, CA (US); Michael Yue Zhang, Mountain View, CA (US); Yury Gaknoki, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 102 days.

(21) Appl. No.: 14/665,944

(22) Filed: Mar. 23, 2015

(65) Prior Publication Data

US 2016/0134189 A1    May 12, 2016

Related U.S. Application Data

(60) Provisional application No. 62/077,136, filed on Nov. 7, 2014.

(51) Int. Cl.
*H05B 37/02* (2006.01)
*H02M 3/157* (2006.01)
(Continued)

(52) U.S. Cl.
CPC .......... *H02M 3/157* (2013.01); *H05B 39/044* (2013.01); *H02M 2001/0009* (2013.01); *H05B 33/0815* (2013.01); *Y02B 20/146* (2013.01)

(58) Field of Classification Search
CPC ............ H05B 33/0815; H05B 33/0824; H05B 33/0851; H05B 39/044; H02M 3/156; H02M 3/157
(Continued)

(56) References Cited

U.S. PATENT DOCUMENTS 8,199,538 B2     6/2012  Piper
9,198,250 B2 *  11/2015  Malyna .............. H05B 33/0815
(Continued)

FOREIGN PATENT DOCUMENTS

EP          2544512 A1       1/2013
GB       2460272 (A)        11/2009
(Continued)

OTHER PUBLICATIONS

European Patent Application No. 15193243.1—Extended European Search Report, dated May 4, 2016, 8 pages.

*Primary Examiner* — Tung X Le
(74) *Attorney, Agent, or Firm* — Blakely Sokoloff Taylor & Zafman LLP

(57) ABSTRACT

A transient event detector includes a first reference generator, an adjustable low-pass filter, and a comparator. The first reference generator coupled to scale the input current signal to generate a first reference current signal that tracks the input current signal. The adjustable low-pass filter circuit is coupled to receive the input current signal and to generate a filtered input current signal such that a magnitude of a slope of the filtered input current signal is less than the magnitude of the slope of the input current signal during a transient event. The first comparator is coupled to generate an event detection signal that indicates the presence of the transient event in response to a value of the filtered input current signal reaching a value of the first reference current signal. The adjustable low-pass filter circuit is configured to increase the cutoff frequency in response to the event detection signal.

22 Claims, 9 Drawing Sheets

(51) Int. Cl.
 *H05B 39/04* (2006.01)
 *H02M 1/00* (2006.01)
 *H05B 33/08* (2006.01)

(58) Field of Classification Search
 USPC .......................................... 315/291; 323/282
 See application file for complete search history.

(56) References Cited

U.S. PATENT DOCUMENTS

| | | | |
|---|---|---|---|
| 9,215,772 B2 * | 12/2015 | Sood ..................... | H02M 7/04 |
| 2007/0279820 A1 * | 12/2007 | Fang .................... | H02H 7/1203 361/97 |
| 2011/0291583 A1 | 12/2011 | Shen | |
| 2012/0133345 A1 * | 5/2012 | Tai ........................ | H02M 3/156 323/282 |

FOREIGN PATENT DOCUMENTS

| | | |
|---|---|---|
| WO | WO 2012/007798 A2 | 1/2012 |
| WO | WO 2014/072847 A1 | 5/2014 |

\* cited by examiner

POWER CONVERTER CONTROLLER WITH INPUT CURRENT SLOPE ADJUSTMENT

CROSS-REFERENCE TO RELATED APPLICATION

This application claims priority under the provisions of 35 U.S.C. §119(e) to U.S. Provisional Application No. 62/077,136, filed Nov. 7, 2014. U.S. Provisional Application No. 62/077,136 is hereby incorporated by reference.

FIELD OF DISCLOSURE

This disclosure relates to power converters and, more particularly, to power converters that drive light emitting diode (LED) lighting with triac dimming circuitry.

BACKGROUND INFORMATION

Light emitting diode (LED) lighting has become very popular due to their many advantages including a longer lifespan, fewer hazards, and potentially increased visual appeal when compared to other lighting technologies, such as for example compact fluorescent lamp (CFL) or incandescent lighting technologies. The advantages provided by LED lighting have resulted in LEDs being incorporated into a variety of lighting technologies, televisions, monitors and other applications that may also require dimming.

One known technique for dimming lighting is the use of a triac or phase angle dimming. A triac circuit operates by removing some beginning or ending portion of each half-cycle of ac power, which is known as "leading edge or trailing edge phase control" respectively. By eliminating some portion of each half-cycle, the amount of power delivered to the lamp is reduced and the light output appears dimmed to the human eye. In most applications, the missing portion of each half-cycle is not noticeable to the human eye because the variations in the phase controlled line voltage and the variations of power delivered to the lamp occur so quickly. While the triac dimming circuits work especially well to dim incandescent light bulbs, when they are used for dimming LED lamps they are likely to produce non-ideal results, such as flickering, blinking, color shifting, and input waveform distortions.

A difficulty in using triac dimming circuits with LED lamps comes from a characteristic of the triac itself. A triac behaves as a controlled switch that is open until it receives a trigger signal at a control terminal, which causes the switch to close. The switch remains closed as long as the current through the switch is above certain threshold levels commonly known as a latching current and a holding current. When the triac fires (e.g., turns on) during each half cycle of the input voltage, the current through the switch suddenly increases (typically, in the form of a spike). This spike may lead to ringing in the triac current due to the parasitic capacitances and inductances around the switch, ultimately causing the triac to misfire. Specifically, because of the ringing, the triac may conduct insufficient current to remain engaged and may prematurely turn off. In some cases, even though the current in the triac is compensated (e.g., by having a bleeder circuit drawing additional current from the triac) to remain above the required threshold levels, the rate at which this current drops while ringing may be high enough such that the compensation may not start in time to prevent the triac current from dipping below one or more of those threshold levels.

BRIEF DESCRIPTION OF THE DRAWINGS

Non-limiting and non-exhaustive embodiments of the present invention are provided in the following figures, wherein like reference numerals refer to like parts throughout the various views unless otherwise specified.

DETAILED DESCRIPTION

Embodiments of circuitry for a power converter controller and a method of operating the circuitry for the power converter controller are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Various examples are described below relating to a variable current circuit and a controller that can be used in a power conversion system having a leading edge dimmer (e.g., a triac). In one example, the power conversion system may be used in an off-line LED driver.

Figure 1:
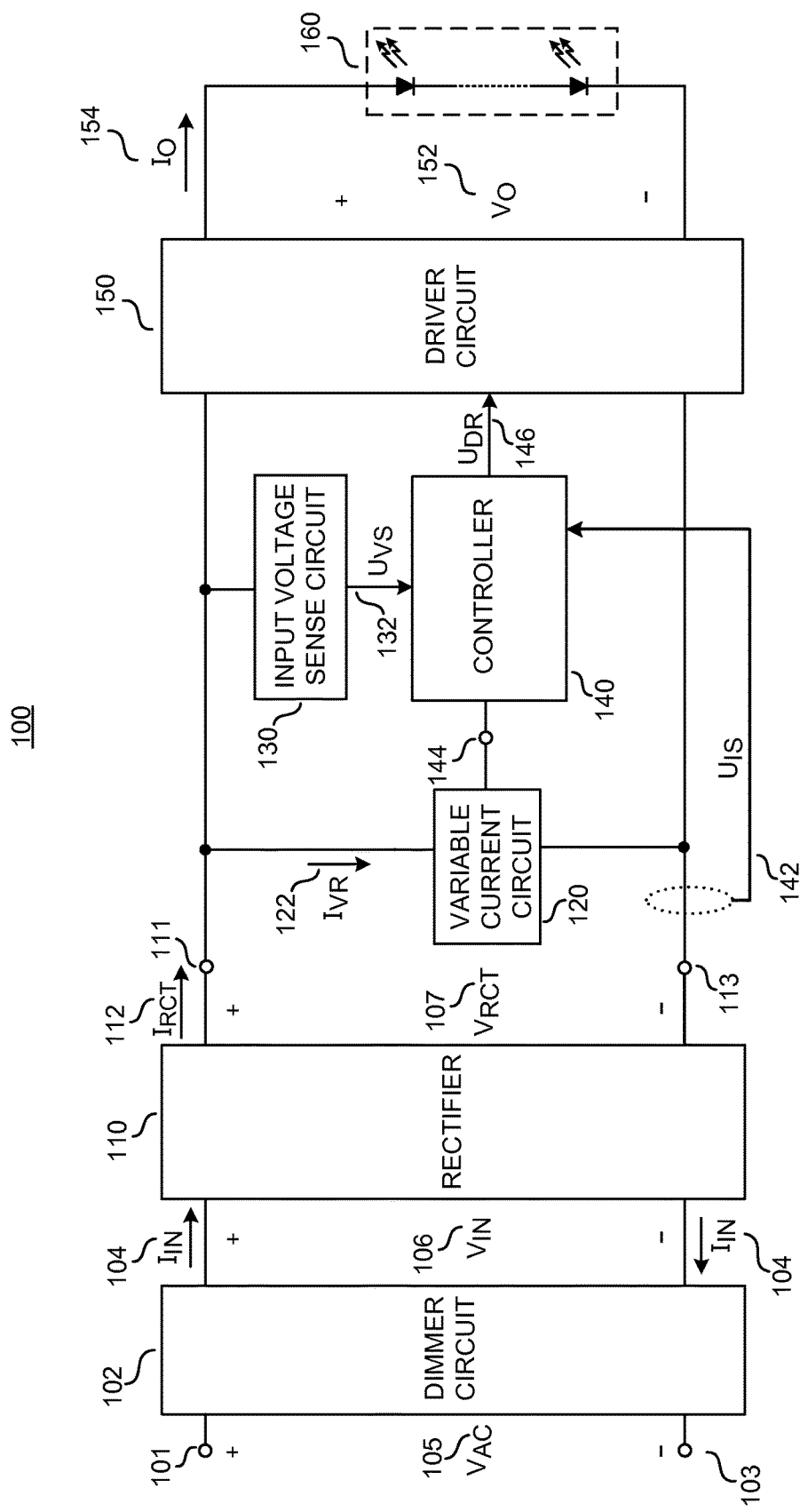
FIG. 1 is a functional block diagram of an example power conversion system including an example controller and an example variable current circuit, in accordance with the teachings of the present disclosure.

FIG. 1 illustrates a functional block diagram of an example power conversion system 100 including a variable current circuit and a controller, in accordance with the teachings of the present disclosure. The illustrated power conversion system 100 includes a dimmer circuit 102, a rectifier 110, a variable current circuit 120, a controller 140, a driver circuit 150, and a load 160.

Power conversion system 100 may provide output power to load 160 from an unregulated ac line voltage $V_{AC}$ 105, also referred to as a line signal. In the illustrated example, line voltage $V_{AC}$ 105 includes a periodic ac line voltage applied between terminals 101 and 103. As shown, dimmer circuit 102 may be coupled to receive line voltage $V_{AC}$ 105 and generate an input current $I_{IN}$ 104 and an input voltage $V_{IN}$ 106 at its output. In one example, dimmer circuit 102 may include a dimmer that blocks line voltage $V_{AC}$ 105 from the input of driver circuit 150 for a portion of the beginning of each half line cycle. Accordingly, input voltage $V_{IN}$ 106 may also be referred to as a truncated line voltage. In operation, dimmer circuit 102 may limit the amount of power delivered to driver circuit 150, thereby lowering the current delivered to load 160. Thus, when load 160 includes an array of LEDs, dimmer circuit 102 may be used to reduce the total light output by the array of LEDs.

In some examples, dimmer circuit 102 may include a triac. In these examples, input voltage $V_{IN}$ 106 may represent the output voltage of the triac and input current $I_{IN}$ 104 may represent the current in the triac (e.g., the triac current). The triac may act as a switch and be used to block the line voltage from the input of driver circuit 150 for a portion of the half line cycle. In operation, when the triac is disengaged (turned off), line voltage $V_{AC}$ 105 is blocked from the input of driver circuit 150 and current to driver circuit 150 is substantially restricted. Conversely, when the triac is engaged (turned on), ac line voltage $V_{AC}$ 105 is unblocked from the input of driver circuit 150 and current is again permitted to conduct to driver circuit 150.

In other examples, dimmer circuit 102 may include one of many known semiconductor switches, such as a metal oxide semiconductor field effect transistor (MOSFET). In these examples, dimmer circuit 102 may switch off (e.g., the switch may transition to the OFF state) and block line voltage $V_{AC}$ 105 from driver circuit 150 for a portion of the beginning of each half line cycle. After a certain amount of time, dimmer circuit 102 may switch on (e.g., the switch may transition to the ON state) and unblock line voltage $V_{AC}$ 105 from driver circuit 150.

In general, the portion of the half line cycle line voltage $V_{AC}$ 105 that is blocked from driver circuit 150 may be related to the amount of dimming desired. For example, the larger the portion of the half line cycle of the line voltage that is blocked, the more pronounced the dimming effect. In lighting applications that use a triac to reduce the total light output, the triac may require at least a first amount of current (sometimes referred to as a latching current) for a threshold period of time (sometimes referred to as a latching period) after turning on and at least a second amount of current (sometimes referred to as a holding current) for the remainder of the half line cycle to remain engaged. Power conversion system 100 may use variable current circuit 120 in conjunction with controller 140 to ensure that the triac current does not drop below the latching current during the latching period and does not drop below the holding current for the remainder of the half line cycle.

As further shown in FIG. 1, dimmer circuit 102 may be coupled to rectifier 110, which, in one example, may include a full bridge rectifier. However, it should be appreciated that other known rectifier circuits may be used. Rectifier 110 may be coupled to receive input voltage $V_{IN}$ 106 and input current $I_{IN}$ 104. In response, rectifier 110 may generate rectified voltage $V_{RCT}$ 107 between its output terminals 111 and 113 and may output rectified current $I_{RCT}$ 112 to output terminals 111 and 113. In other words, rectified voltage $V_{RCT}$ 107 may correspond to the rectified version of input voltage $V_{IN}$ 106 and rectified current $I_{RCT}$ 112 may correspond to the rectified version of input current $I_{IN}$ 104. In the illustrated example, terminal 113 may also be referred to as a ground reference. In power conversion system 100, driver circuit 150 may produce an output voltage $V_{OUT}$ 152 and output current $I_{OUT}$ 154 across load 160. Driver circuit 150 may include a switch mode power converter. In one example, driver circuit 150 includes a flyback power converter. It should be noted that other converter topologies such as buck converter, boost converter, buck-boost converter can also be used in driver circuit 150.

As further illustrated, variable current circuit 120 is coupled to the input of driver circuit 150 between terminals 111 and 113, and has an input coupled to an output terminal 144 of controller 140. In operation, variable current circuit 120 conducts a current $I_{VR}$ 122 between terminals 111 and 113 that is responsive to a signal received by the input of variable current circuit 120.

In the example power conversion system illustrated in FIG. 1, controller 140 is coupled to receive a voltage sense signal $U_{VS}$ 132 representative of rectified voltage $V_{RCT}$ 107 (hence, input voltage $V_{IN}$ 106) and receive a current sense signal $U_{IS}$ 142 representative of rectified current $I_{RCT}$ 112. In one example, power conversion system 100 may include an input voltage sense circuit 130 coupled to sense rectified voltage $V_{RCT}$ 107 and produce voltage sense signal $U_{VS}$ 132 in response to rectified voltage $V_{RCT}$ 107.

Any one of a variety of means to sense current, such as for example receiving the voltage across a resistor conducting the current, or for example receiving a scaled current from a current transformer, or for example receiving the voltage across the on-resistance of a metal oxide semiconductor field-effect transistor (MOSFET) that conducts the current, may be used to sense rectified current $I_{RCT}$ 112 and to provide current sense signal $U_{IS}$ 142 to controller 140.

Controller 140 is further coupled to output a drive signal $U_{DR}$ 146 to driver circuit 150 to control the energy transfer from the input to the output of driver circuit 150, thereby regulating an output quantity (e.g., output voltage $V_{OUT}$ 152, output current $I_{OUT}$ 154, or the combination of the two) at a desired level. More specifically, controller 140 can control the energy transfer by driving a switch of driver circuit 150 with drive signal $U_{DR}$ 146. In operation, controller 140 can adjust drive signal $U_{DR}$ 146 in response to at least one of voltage sense signal $U_{VS}$ 132, current sense signal $U_{IS}$ 142, and a feedback signal (not shown) representative of the output quantity. For example, controller 140 can adjust drive signal $U_{DR}$ 146 to prevent the energy transfer from the input to the output of driver circuit 150 (e.g., by disabling the switching of the switch of driver circuit 150) when voltage sense signal $U_{VS}$ 132 indicates that the portion of the half-line cycle that line voltage $V_{AC}$ 105 is blocked by dimmer circuit 102 has reached a threshold amount. Furthermore, controller 140 can control the energy transfer from the input to the output of driver circuit 150 to provide power factor correction (PFC) such that rectified current $I_{RCT}$ 112 is in phase with and proportional to rectified voltage $V_{RCT}$ 107 (hence, input voltage $V_{IN}$ 106).

Additionally, controller 140 can adjust the signal that is output to output terminal 144 in response to at least one of current sense signal $U_{IS}$ 142 and voltage sense signal $U_{VS}$ 132 to vary the signal received by the input of variable current circuit 120 and hence, vary current $I_{VR}$ 122. For example, by varying current $I_{VR}$ 122 in response to current sense signal $U_{IS}$ 142, controller 140 can control rectified current $I_{RCT}$ 112 to ensure that a sufficient latching current is drawn from dimmer circuit 102 for the latching period after dimmer circuit 102 turns on and a sufficient holding current is drawn from dimmer circuit 102 for the remainder of the half line cycle. This may prevent dimmer circuit 102 from turning off prematurely during a half line cycle and thus, help prevent the fluctuations in the light output (e.g. LED light output).

Figure 2:
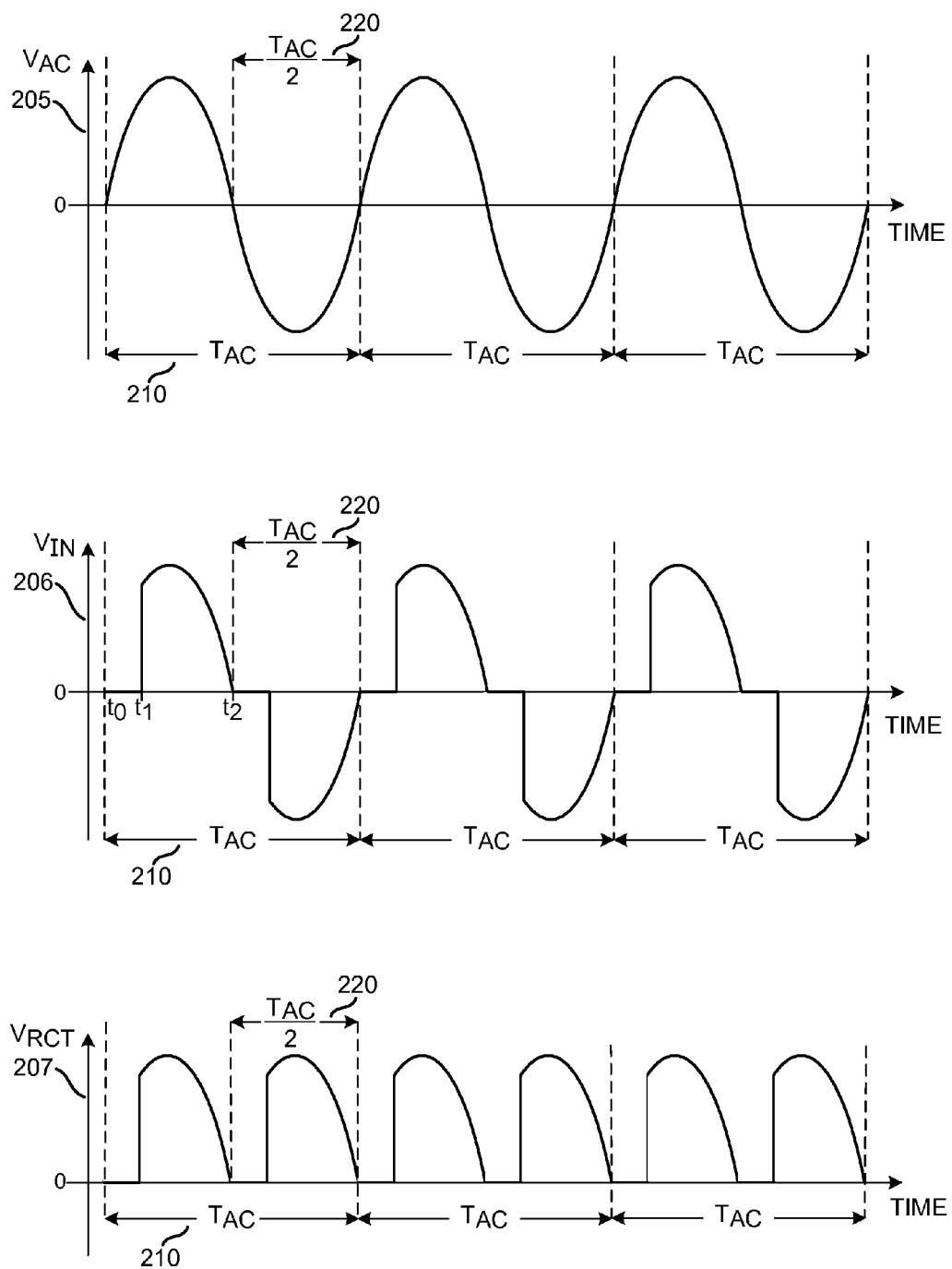
FIG. 2 illustrates an example input voltage waveform, an example dimmed input voltage, and an example dimmed rectified input voltage, in accordance with the teachings of the present disclosure.

FIG. 2 illustrates example waveforms that are associated with various voltage signals of power conversion system 100 when a leading edge dimmer is used to implement phase dimming, in accordance with the teachings of the present disclosure. Waveform 205 is one example representation of line voltage $V_{AC}$ 105. As shown, waveform 205 is a sinusoidal waveform with a period $T_{AC}$ 210, which may also be referred to as a full line cycle. Similarly, half of period $T_{AC}$ 210 ($T_{AC}/2$ 220) may be referred to as a half line cycle. Waveform 206 is one possible representation of input voltage $V_{IN}$ 106 that may correspond to the output voltage of dimmer circuit 102. As previously noted, dimmer circuit 102 may block line voltage $V_{AC}$ 105 from driver circuit 150 for a portion of the beginning of the half line cycle to limit the amount of power delivered to load 160. For example, in the half line cycle between time $t_0$ and time $t_2$, waveform 206 is substantially zero volts between time $t_0$ and time $t_1$ due to dimmer circuit 102 blocking line voltage $V_{AC}$ 105. For the remaining portion of the half line cycle (between time $t_1$ and time $t_2$) dimmer circuit 102 unblocks line voltage $V_{AC}$ 105 and, as shown, waveform 206 substantially follows waveform 205. Waveform 207 is one possible representation of rectified voltage $V_{RCT}$ 107 generated by rectifier 110. As depicted, waveform 207 is similar to waveform 206 except that portions of waveform 206 that are below zero volts are rectified to positive voltages of equal magnitude. In other words, $V_{RCT}=|V_{IN}|$.

Figure 3A:
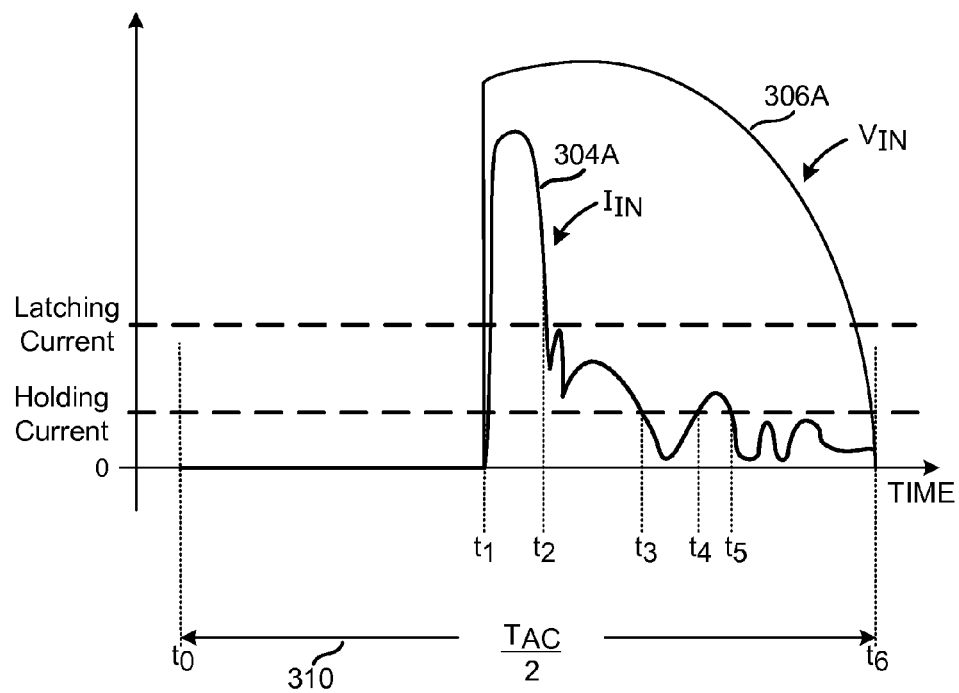
FIG. 3A shows an example dimmed input voltage and an example input current signal at the output of a dimmer circuit implementing a leading edge dimming without input current slope adjustment, in accordance with the teachings of the present disclosure.

FIG. 3A shows one example set of waveforms for voltage and current signals at the output of a dimmer circuit including a leading edge dimmer that can be used in power conversion system 100, in accordance with the teachings of the present disclosure. In one example, the leading edge dimmer may be a triac and these waveforms may be representative of the voltage and current signals at the output of the triac when variable current circuit 120 is not included in power conversion system 100 or not configured to be operative. Waveform 306A corresponds to one example representation of input voltage $V_{IN}$ 106 for one half line cycle, and waveform 304A corresponds to one example representation of input current $I_{IN}$ 104 (i.e., the triac current) for one half line cycle. Period 310 is representative of one half line cycle ($T_{AC}/2$). As shown, the triac is switched off (i.e., disengaged) and not conducting current at the beginning of period 310 between time $t_0$ and time $t_1$. Thus, waveform 306A is substantially zero volts between time $t_0$ and time $t_1$ as the triac blocks line voltage $V_{AC}$ 105. At time $t_1$, the triac is switched on (e.g., engaged) and starts conducting current. The triac current rises above the latching current shortly after time t1 and then stays above the latching current until time t2 as shown by waveform 304A. In the depicted example, the time period between time t1 and time t2 indicates the latching period. Since the triac current is above the latching current for the latching period, the triac is engaged during this period. The triac may remain engaged until time $t_6$ (the end of the half line cycle) as long as the triac current stays above the holding current. As such, in an ideal case with the triac remaining on throughout the time period between time $t_1$ and time $t_6$, waveform 306A substantially follows line voltage $V_{AC}$ 105 as shown in FIG. 3A. However, as previously mentioned, when the triac switches on, waveform 304A suddenly rises from zero. This may cause ringing in the triac current due to the parasitic inductances and capacitances around the triac. Without variable current circuit 120 conducting current between terminals 111 and 113, the resulting ringing may cause the triac current to drop below the holding current and turn off the triac, which may then force input voltage $V_{IN}$ 106 represented by waveform 306A to drop to zero volts. As a result, driver circuit 150 may deliver less than the desired amount of power to load 160 and the light output by load 160 may fluctuate noticeably. In the illustrated example of FIG. 3A, waveform 304A is above the holding current between time $t_2$ and time $t_3$ during which the triac is on and conducting current and during which waveform 306A follows line voltage $V_{AC}$ 105. Between time $t_3$ and time $t_4$ input current $I_{IN}$ 104 represented by waveform 304A goes below the holding current and in turn, can cause the triac to turn off and waveform 306A to drop to zero volts (not shown). If this happens, the triac may not turn on even if waveform 304 goes above the holding current again such as between time t4 and time t5.

Figure 3B:
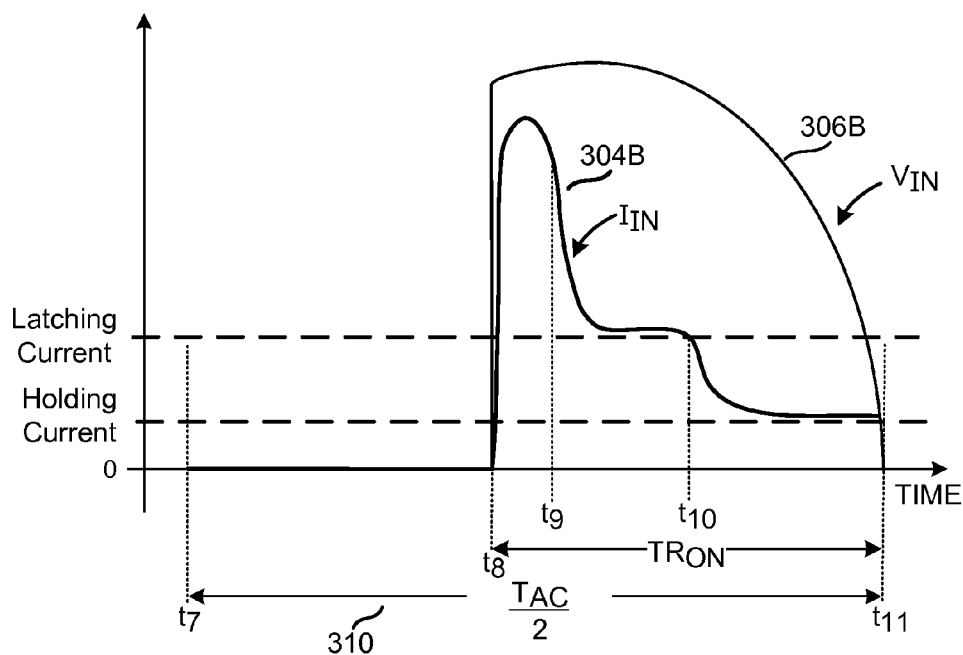
FIG. 3B shows an example dimmed input voltage and an example input current signal at the output of a dimmer circuit implementing a leading edge dimming with input current slope adjustment, in accordance with the teachings of the present disclosure.

FIG. 3B shows another example set of waveforms for voltage and current signals at the output of the dimmer circuit including a leading edge dimmer that can be used in power conversion system 100, in accordance with the teachings of the present disclosure. Waveforms 304B and 306B in FIG. 3B are similar to 304A and 306A, except that these waveforms are representative of the voltage and current signals at the output of the triac when variable current circuit 120 is operating in conjunction with controller 140 to control the triac current. As shown, with controller 140 adjusting the signal that is output to output terminal 144 to vary the current conducted by variable current circuit 120 in order to control the triac current, the ringing in the triac current is largely eliminated. Moreover, the minimum value of the triac current is kept at a level above the latching current for a certain period time (until time t10) after the triac turns on. Generally, the amount of time that it takes for the triac current to drop to the latching current varies based on the input impedance of driver circuit 150. If the triac current drops below the latching current before the latching period is over, the triac may turn off. Further, the triac may not turn on even if the triac current goes above the latching current later. By keeping the minimum value of the triac current at a level above the latching current for a certain period of time after the triac turns on, controller 140 can ensure that the triac remains on throughout the latching period. As further illustrated, waveform 304B starts to drop at time t10 but eventually settles at a level above the holding current and remains at that level until time t11. That is, the triac current remains above the holding current after the latching period until the end of period 310. As a result, the triac remains on and conducts current, causing waveform 306B to follow line voltage $V_{AC}$ 105 for the remainder of period 310 (i.e., between time t8 and time t11). This may reduce the fluctuations in the power delivered by driver circuit 150 to load 160 and thus, help power conversion system 100 maintain a steady light output during dimming.

Figure 4:
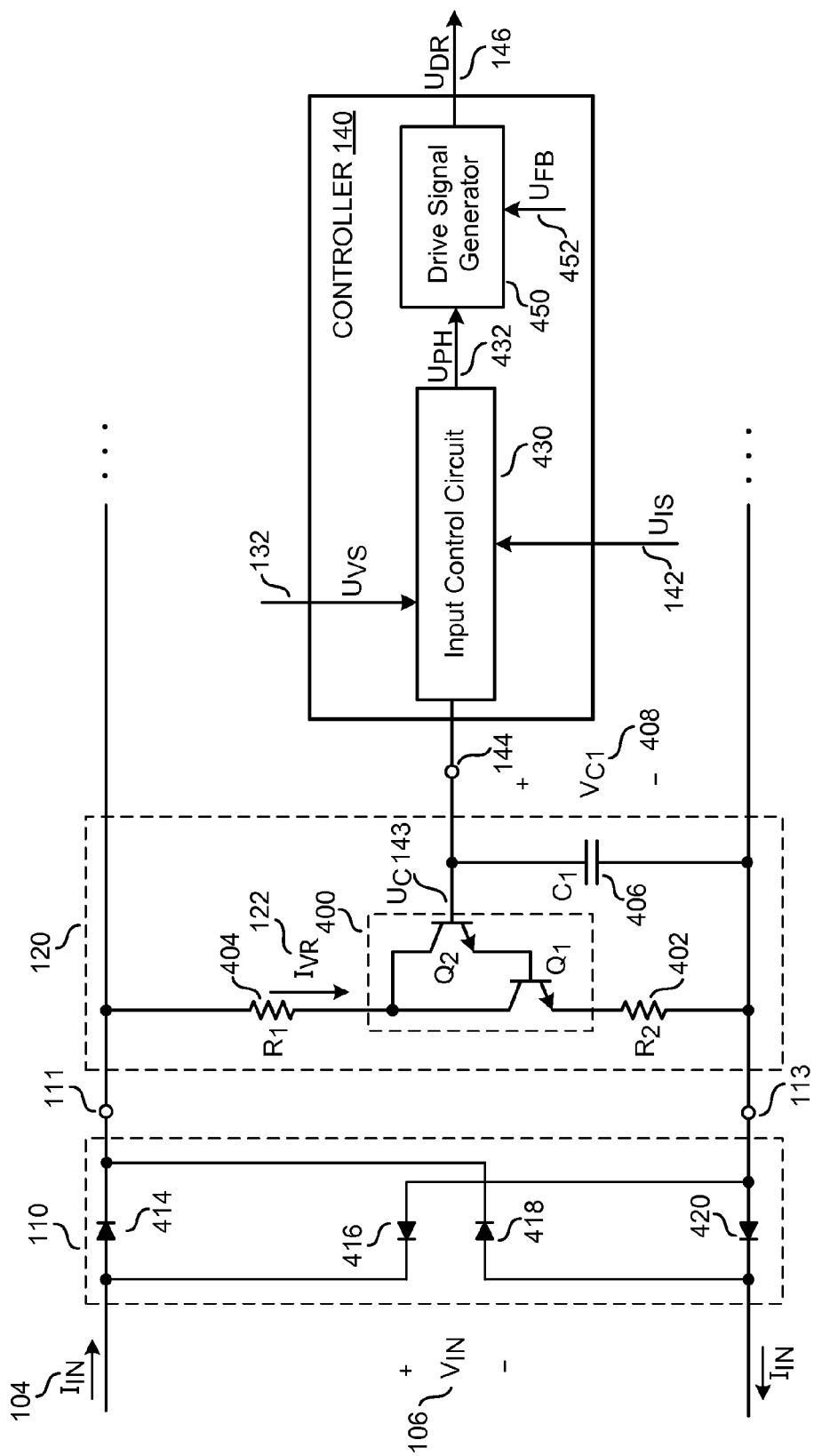
FIG. 4 illustrates a circuit diagram of an example variable current circuit and a function block diagram for an example controller that includes an input control circuit, in accordance with the teachings of the present disclosure.

FIG. 4 illustrates an example circuit diagram showing examples of rectifier 110 and variable current circuit 120, in accordance with the teachings of the present disclosure. FIG. 4 also illustrates a block diagram schematic of controller 140. Variable current circuit 120 may be referred to a bleeder circuit and controller 140 may be referred to as a bleeder controller since it outputs a signal to output terminal 144 that controls current $I_{VR}$ 122.

Rectifier 110 includes diodes 414, 416, 418, and 420, in FIG. 4. Variable current circuit 120 includes amplifying circuitry 400, resistors R1 404 and R2 402, and a capacitor C1 406. Capacitor C1 406 is coupled between the input of variable current circuit 120 and terminal 113. Amplifying circuitry 400 is coupled to terminal 111 with resistor R1 404 and to terminal 113 with resistor R2 402. In the illustrated example, the signal received by the input of variable current circuit 120 (control signal UC 143) represents a current that is output to output terminal 144 and the voltage across output terminal 144 and terminal 113 represents a voltage VC1 408 across capacitor C1 406. In one example, amplifying circuitry 400 includes a Darlington pair comprising NPN bipolar transistors Q1 and Q2 as illustrated. Darlington pair can also be implemented by using PNP bipolar transistors. Alternatively, amplifying circuitry 400 can include an amplifier, such as an operational amplifier, transconductance amplifier and/or comprise other transistors, such as MOSFETs, insulated gate bipolar transistors (IGBTs), or junction gate field-effect transistors (JFETs). In operation, when voltage VC1 408 is less than a turn-on threshold (i.e., the sum of the threshold voltages of transistors Q1 and Q2), amplifying circuitry 400 does not conduct current between terminals 111 and 113. When voltage VC1 408 is equal to or greater than the turn-on threshold, amplifying circuitry 400 can either act as a switch or a current amplifier.

In one example, transistors Q1 and Q2 can operate in either the active or saturation region. In a case where transistors Q1 and Q2 operate in the active region, amplifying circuitry 400 can act as a current amplifier and thus, conduct an amplified version of the control signal as current $I_{VR}$ 122 between terminals 111 and 113. That is, current $I_{VR}$ 122 is substantially equal to the control signal multiplied by the gain of amplifying circuitry 400. The gain of amplifying circuitry 400 can be the product of the beta of transistor Q1 and the beta of transistor Q2. Resistor R2 402 reduces the gain of amplifying circuitry 400 and can be used to set the gain to a desired value.

In another example where transistors Q1 and Q2 operate in the saturation region, amplifying circuitry 400 can acts as a switch. In this case, the magnitude of current $I_{VR}$ 122 depends on the resistance of resistor R1 404. As such, resistor R1 404 can set the maximum amount of current that amplifying circuitry 400 can conduct between terminals 111 and 113.

Controller 140 includes an input control circuit 430 and a drive signal generator 450. Input control circuit 430 is coupled to receive voltage sense signal $U_{VS}$ 132 and current sense signal $U_{IS}$ 142. Input control circuit 430 outputs control signal $U_C$ 143 to output terminal 144 in response to at least one of voltage sense signal $U_{VS}$ 132 and current sense signal $U_{IS}$ 142. Additionally, input control circuit 430 outputs a phase signal $U_{PH}$ 432 in response to at least voltage sense signal $U_{VS}$ 132 and current sense signal $U_{IS}$ 142. Phase signal $U_{PH}$ 432 represents a portion of the half-line cycle that line voltage $V_{AC}$ 105 is provided to driver circuit 150 which may also be referred to as a conduction angle. Input control circuit 430 can adjust both the magnitude and the direction of control signal $U_C$ 143. For example, input control circuit 430 can increase control signal $U_C$ 143 by providing more current to output terminal 144 if more current needs to be drawn by the variable current circuit 120 to maintain proper operation of dimmer circuit 102. However, if no current needs to be drawn by the variable current circuit 120 to maintain proper operation of dimmer circuit 102, input control circuit 430 can remove current from output terminal 144 such that voltage $V_{C1}$ 408 drops below the turn-on threshold and as a result, stops variable current circuit 120 from conducting current $I_{VR}$ 122.

In addition, when current sense signal UIS 142 indicates that the rate of drop of rectified current IRCT 112 (hence, input current IIN 104) has reached a threshold rate, input control circuit 430 can increase current IVR 122 by providing more current to output terminal 144 in order to reduce the rate of drop of rectified current IRCT 112. As previously mentioned, in cases where dimmer circuit 102 includes a triac, the triac current spikes up after the triac turns on but soon after begins to drop. If the rate of this drop becomes greater than a certain rate, the triac current may go below the latching current and/or the holding current before input control circuit 430 can respond to bring the triac current above those levels. Therefore, by reducing the rate of the drop of the triac current, input control circuit 430 can help prevent the triac current from dipping below the latching current and/or the holding current.

Drive signal generator 450 is coupled to receive a feedback signal $U_{FB}$ 452 representative of the output quantity of power conversion system 100 and phase signal $U_{PH}$ 432. Feedback signal $U_{FB}$ 452 can be generated inside controller 140 or can be received from an external circuitry. Drive signal generator 450 outputs drive signal $U_{DR}$ 146 to control the energy transfer from the input to the output of driver circuit 150 such that the output quantity of power conversion system 100 is regulated at a desired level. Drive signal generator 450 can adjust drive signal $U_{DR}$ 146 in response to at least one of phase signal $U_{PH}$ 432 and feedback signal $U_{FB}$ 452 to control the energy transfer from the input to the output of driver circuit 150.

Figure 5:
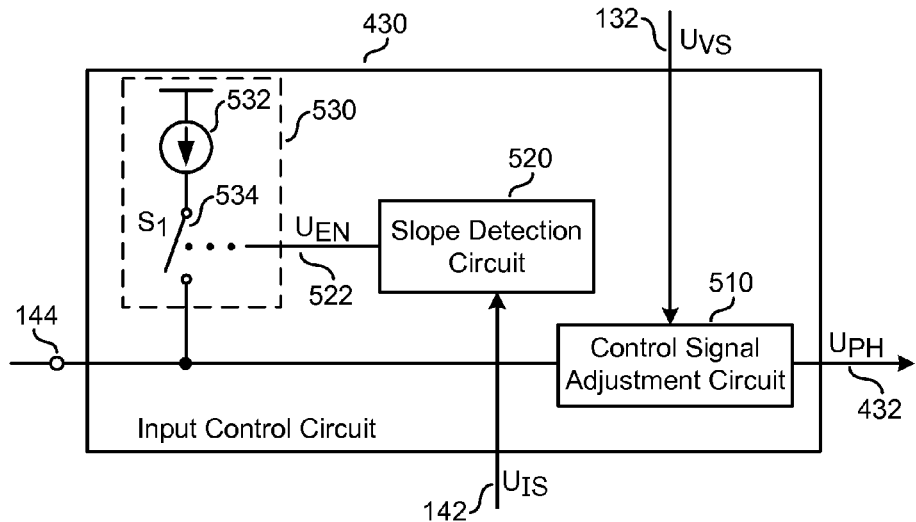
FIG. 5 is functional block diagram of an input control circuit, in accordance with the teachings of the present disclosure.

FIG. 5 is functional block diagram of an example input control circuit 535, in accordance with the teachings of the present disclosure. Input control circuit 535 is one example implementation of input control circuit 430. Input control circuit 535 includes slope detection circuit 520, a control signal adjustment circuit 510, switchable current circuitry 530 and phase detection circuit 540. Control signal adjustment circuit 510 controls the current going in and out of output terminal 144 in response to $U_{VS}$ 132. In other words, control signal adjustment circuit 510 may source or sink current to output terminal 144 to adjust control signal $U_C$ 143. Switchable current circuitry 530 includes a current source 532 coupled to provide a current to output terminal 144 that influences control signal $U_C$ 143. Switchable current circuitry 530 includes switch S1 534, which is controlled by enable signal $U_{EN}$ 522. Enable signal $U_{EN}$ 522 may also be referred to as an event detection signal and may indicate whether the rate of drop of rectified current IRCT 112 has reached the threshold rate. In the illustrated example, slope detection circuit 520 is coupled to generate enable signal $U_{EN}$ 522 in response to current sense signal $U_{IS}$ 142. In one example, when the enable signal $U_{EN}$ 522 is asserted (logic high in one example) indicating that the rate of drop of rectified current $I_{RCT}$ 112 has reached the threshold rate, switch S1 534 is closed and current source 532 is coupled to output terminal 144. When the enable signal $U_{EN}$ 522 is not asserted (logic low in one example), switch S1 534 is open and current source 532 is not coupled to output terminal 144.

Figure 6:
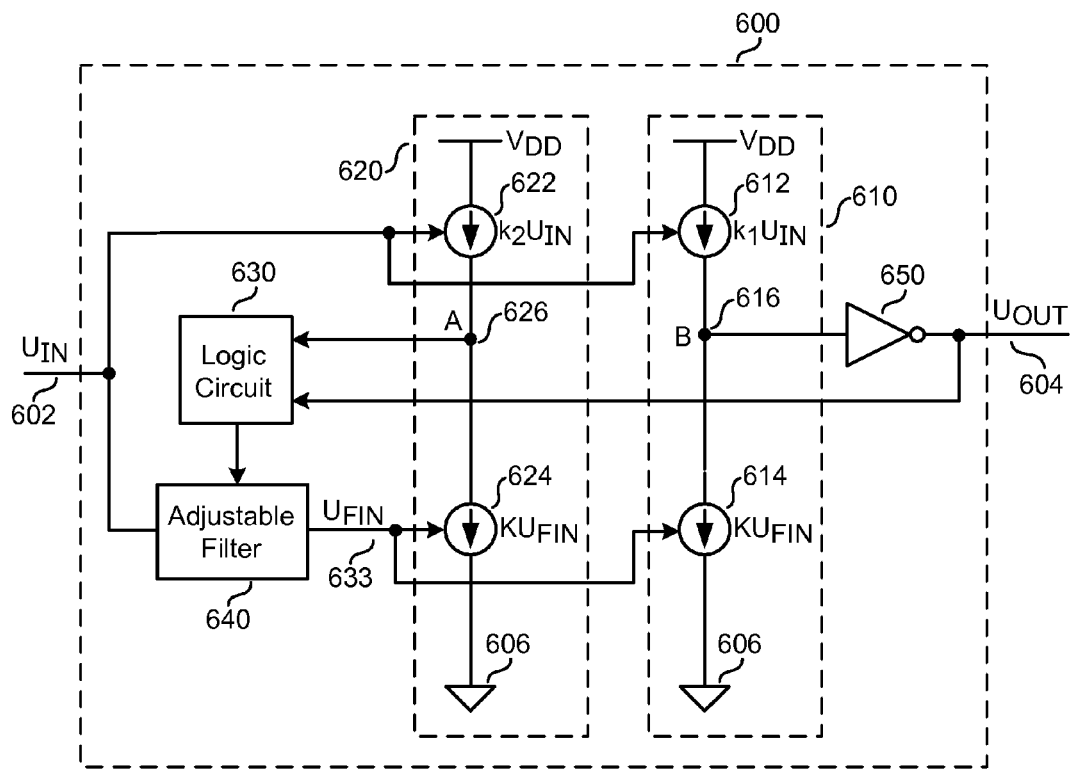
FIG. 6 is a functional block diagram of a slope detection circuit, in accordance with the teachings of the present disclosure.

FIG. 6 is a block diagram of a slope detection circuit 600, in accordance with the teachings of the present disclosure. Slope detection circuit 600 may also be referred to as a transient event detector because it is responsive to higher frequency components (i.e. transients) of a current signal in some example implementations. Slope detection circuit 600 includes first reference generator 610, second reference generator 620, logic circuit 630, and adjustable low-pass filter 640. In one example, slope detection circuit 600 corresponds to slope detection circuit 520 of FIG. 5.

In FIG. 6, slope detection circuit 600 receives input signal $U_{IN}$ 602. Input signal $U_{IN}$ 602 is an example of current sense signal $U_{IS}$ 142. First reference generator 610 and second reference generator 620 are coupled to receive input current sense signal $U_{IN}$ 602. First reference generator 610 includes a first current amplifier 612 coupled to generate a first reference current that is greater than input current sense signal $U_{IN}$ 602. First current amplifier 612 has a first scale factor of $k_1$ in FIG. 6 to generate the first reference current that has a value of $k_1 * U_{IN}$ 602. As such, the first reference current (also referred to as an upper reference current) is greater than (by first scale factor $k_1$) and tracks input current sense signal $U_{IN}$ 602. In one example, scale factor $k_1$ is 1.10.

Second reference generator 620 includes a second current amplifier 622 coupled to generate a second reference current that is less than input current sense signal $U_{IN}$ 602. Second current amplifier 622 has a second scale factor of $k_2$ in FIG. 6 to generate the second reference current signal that has a value of $k_2 * U_{IN}$ 602. As such, the second reference current (also referred to as a lower reference current) is less than (by second scale factor $k_2$) and tracks input current sense signal $U_{IN}$ 602. In one example, scale factor $k_2$ is 0.9.

Adjustable low-pass filter 640 generates a filtered input current signal $U_{FIN}$ 633 corresponding to a filtered version of input signal $U_{IN}$ 602 in response to input current sense signal $U_{IN}$ 602 and in response to an output of logic 630. Adjustable low-pass filter 640 is an adjustable low-pass filter with an adjustable cut-off frequency. As such, the magnitude of the slope of filtered input current signal $U_{FIN}$ 633 is less than the magnitude of the slope of input current sense signal $U_{IN}$ 602 when input current sense signal $U_{IN}$ 602 is changing at a certain rate (e.g., at a rate equal to the cut-off frequency of the filter) or above. A third current amplifier 614 in first reference generator 610 scales filtered input signal $U_{FIN}$ 633 by a scaling factor K to generate a scaled version of filtered input signal $U_{FIN}$ 633, which is illustrated as $KU_{FIN}$ in FIG. 6. A fourth current amplifier 624 in second reference generator 620 scales filtered input signal $U_{FIN}$ 633 by the same scaling factor K to generate a scaled version ($KU_{FIN}$) of filtered input signal $U_{FIN}$ 633.

Figure 7:
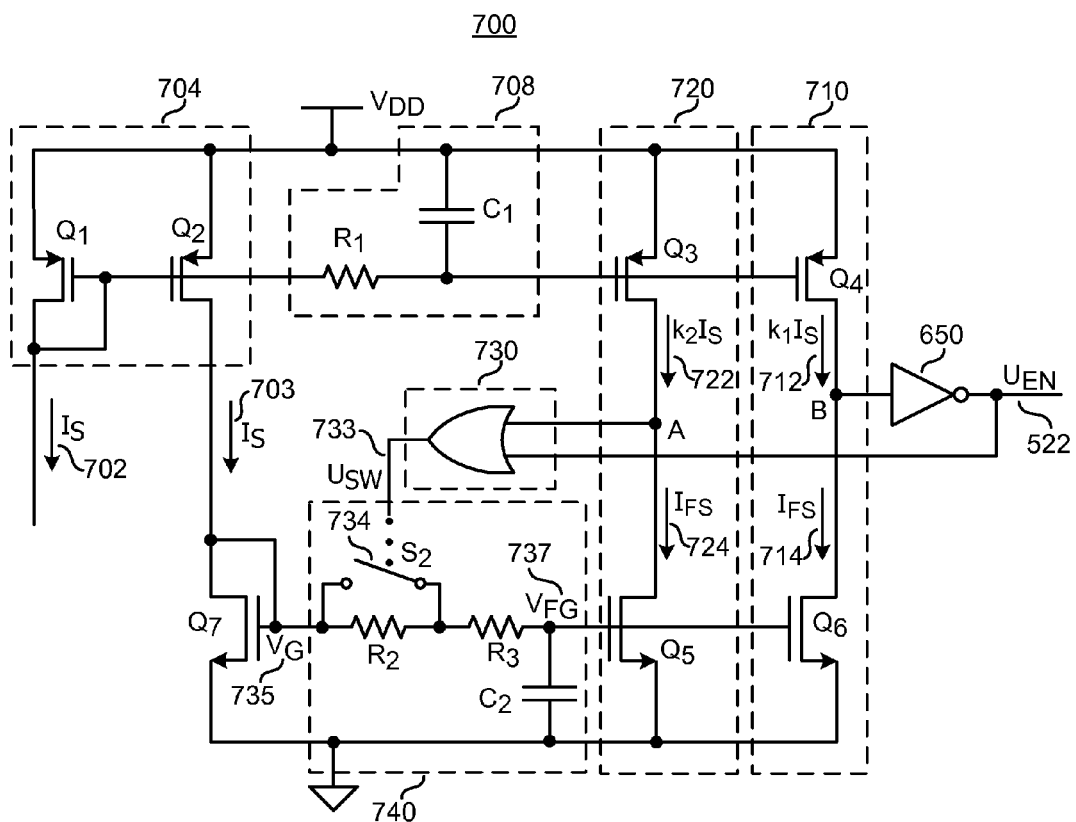
FIG. 7 is an example schematic diagram illustrating a slope detection circuit, in accordance with the teachings of the present disclosure.

FIG. 7 illustrates example implementation of the components of slope detection circuit 600, in accordance with the teachings of the present disclosure. Slope detection circuit 700 includes a current mirror 704, an input filter 708, upper reference generator 710, and lower reference generator 720, an OR gate 730, and an adjustable low-pass filter 740. Current mirror 704 includes transistors Q1 and Q2. Transistor Q2 provides an input current $I_S$ 703 that mirrors input current $I_S$ 702, which is an example of input current sense signal $U_{IN}$ 602. Input filter 708 includes a resistor $R_1$ and a capacitor $C_1$ and has a cut-off frequency that is significantly (e.g., three orders of magnitude) higher than the cut-off frequency of adjustable low-pass filter 740. Input filter 708 is configured to filter out high frequency noise from input current $I_S$ 702.

Adjustable low-pass filter 740 includes switch $S_2$ 734, resistor $R_2$, resistor $R_3$, and capacitor $C_2$. In the illustrated example, input current $I_S$ 703 sets the voltage at the control terminal (e.g., gate) of transistor $Q_7$ which is also referred to as a gate voltage $V_G$ 735. Adjustable low-pass filter 740 receives gate voltage $V_G$ 735 and outputs a filtered gate voltage $V_{FG}$ 737. Filtered gate voltage $V_{FG}$ 737 is a low-pass filtered version of gate voltage $V_G$ 735. When switch $S_2$ 734 is closed, resistor $R_2$ is shorted, which increases the cut-off frequency of adjustable low-pass filter 740. This allows filtered gate voltage $V_{FG}$ 737 to have higher frequency components. When switch $S_2$ 734 is open (when the output of OR gate 730 is low), resistor $R_2$ is coupled in series with resistor $R_3$, which decreases the cut-off frequency of adjustable low-pass filter 740. This reduces higher frequency components in filtered gate voltage $V_{FG}$ 737.

Upper reference generator 710 includes transistors $Q_4$ and $Q_6$. Input current $I_S$ 702 controls the control terminal (e.g. base or gate) of transistor $Q_1$. Since the control terminal of transistor $Q_1$ is coupled to the control terminal of transistor $Q_4$, upper reference current $k_1 I_S$ 712 is a scaled version (according to first scale factor $k_1$) of input current $I_S$ 702 based on the ratio of the aspect ratio (i.e., ratio of the width to the length of the transistor) of transistor $Q_4$ to the aspect ratio of transistor $Q_1$. Lower reference generator 720 includes transistors $Q_3$ and $Q_5$. Since the control terminal of transistor $Q_1$ is also coupled to the control terminal of transistor $Q_3$, lower reference current $k_2 I_S$ 722 is a scaled version (according to second scale factor $k_2$) of current $I_S$ 702 based on the ratio of the aspect ratio of transistor $Q_3$ to the aspect ratio of transistor $Q_1$.

In the depicted example, the control terminal of transistor $Q_5$ is coupled to control terminal of transistor $Q_7$ and receives a low-pass filtered version of gate voltage $V_G$ 735 as filtered gate voltage $V_{FG}$ 737. As such, the current that transistor $Q_5$ sinks from node A becomes a low-pass filtered version of input current $I_S$ 702, which is referred to as a filtered current $I_{FS}$ 724. Filtered current $I_{FS}$ 724 may also be a scaled version of input current $I_S$ 702 according to the ratio of the aspect ratio of transistor $Q_5$ to the aspect ratio of transistor $Q_7$. As further shown, the control terminal of transistor $Q_6$ is also coupled to control terminal of transistor $Q_7$ and receives a low-pass filtered version of gate voltage $V_G$ 735 as filtered gate voltage $V_{FG}$ 737. As a result, the current that transistor $Q_6$ sinks from node B is a low-pass filtered version of input current $I_S$ 702, which is referred to as a filtered current $I_{FS}$ 714. Specifically, if the aspect ratio of transistor $Q_6$ is equal to the aspect ratio of transistor $Q_5$, which is the case in the illustrated example, the current that transistor $Q_6$ sinks from node B becomes equal to filtered current $I_{FS}$ 724.

Slope detection circuit 700 also includes an inverter 650 that is coupled to node B to output enable signal $U_{EN}$ 522. When transistor $Q_6$ sinks more current from node B than transistor $Q_4$ is sourcing to node B, the voltage at node B drops below a threshold of comparator 650 thereby setting enable signal $U_{EN}$ 522 to a logic high signal. The logic high signal on the output of comparator 650 triggers a digital high on the output of OR gate 730 as switching signal $U_{SW}$ 733, which closes switch $S_2$ 734 in adjustable low-pass filter 740, in the illustrated example. When transistor $Q_5$ sinks less current from node A than $Q_3$ is sourcing to node A, the voltage at node A rises above a digital high threshold of OR gate 730, which triggers a digital high on the output of OR gate 730 as switching signal $U_{SW}$ 733 and as a result, closes switch $S_2$ 734, in the illustrated example. Operation of slope detection circuit 700 can be explained in greater detail with reference to FIGS. 8A and 8B.

Figure 8A:
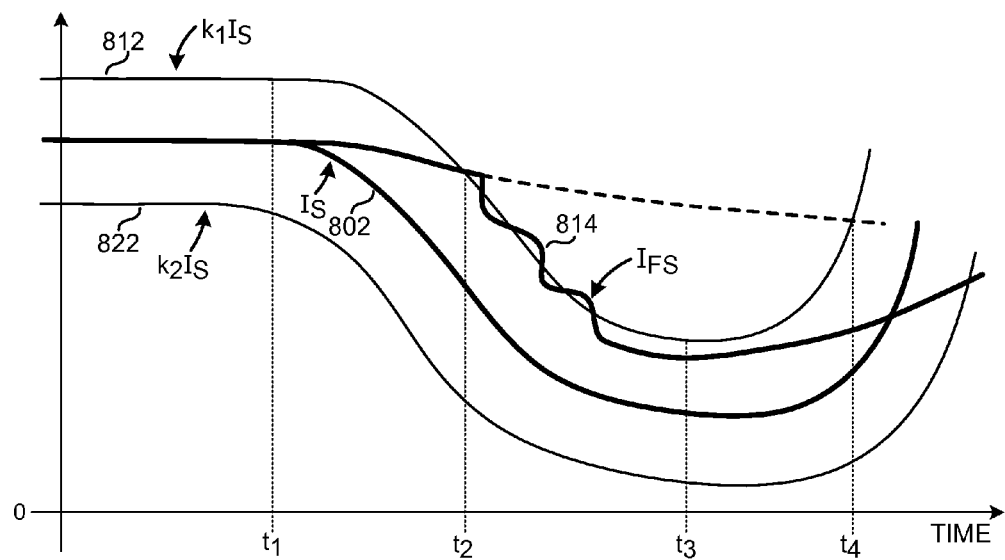
FIGS. 8A and 8B illustrate example waveforms for various signals that are associated with the slope detection circuit illustrated in FIG. 7, in accordance with the teachings of the present disclosure.

FIG. 8A shows example waveforms for several signals that are associated with the slope detection circuit illustrated in FIG. 7. Waveform 812 is one possible representation of upper reference current $k_1 I_S$ 712, waveform 822 is one possible representation of lower reference current $k_2 I_S$ 722, waveform 802 is one possible representation of input current $I_S$ 702 (hence, input current $I_{IN}$ 104), and waveform 814 is one possible representation of filtered currents $I_{FS}$ 714 and $I_{FS}$ 724. As shown, waveform 812 is offset above and tracks waveform 802 (i.e., waveform 812 is equal to waveform 802 multiplied by a scaling factor greater than 1). Waveform 822 is offset below and tracks waveform 802 (i.e., waveform 822 is equal to waveform 802 multiplied by a scaling factor less than 1). As further illustrated, waveform 802 begins to drop at time t1. Waveform 814 also begins to drop but at a lower rate of change (slope) due to adjustable low-pass filter 740 reducing higher frequency components in filtered currents $I_{FS}$ 714 and $I_{FS}$ 724. Waveform 814 reaches waveform 812 at time t2, which may indicate that the rate of drop of input current $I_S$ 702 has reached the threshold rate. This causes switch $S_2$ 734 to close, thereby increasing the cut-off frequency of adjustable low-pass filter 740 and allowing waveform 814 to track waveform 802 more closely (and more quickly). As further shown in FIG. 8A, waveform 814 has a noticeable change in slope shortly after crossing waveform 812. This noticeable change in slope is indicative of adjustable filter 740 increasing its cut-off frequency to a frequency that is several orders of magnitude higher (e.g., 100 times higher) than the original cut-off frequency, thereby increasing the magnitude of the slope of waveform 814. Soon after, waveform 814 drops below waveform 812, which returns the cut-off frequency of adjustable low-pass filter 740 to its original cut-off frequency (between 1.5 kHz and 15 kHz in some examples). Between times t2 and t3, waveform 814 crosses and recrosses waveform 812 as waveform 802 continues to drop until time t3. From thereon, waveform 802 no longer drops at a rate that is greater than or equal to the threshold rate and thus, waveform 814 stays below waveform 812.

Figure 9A:
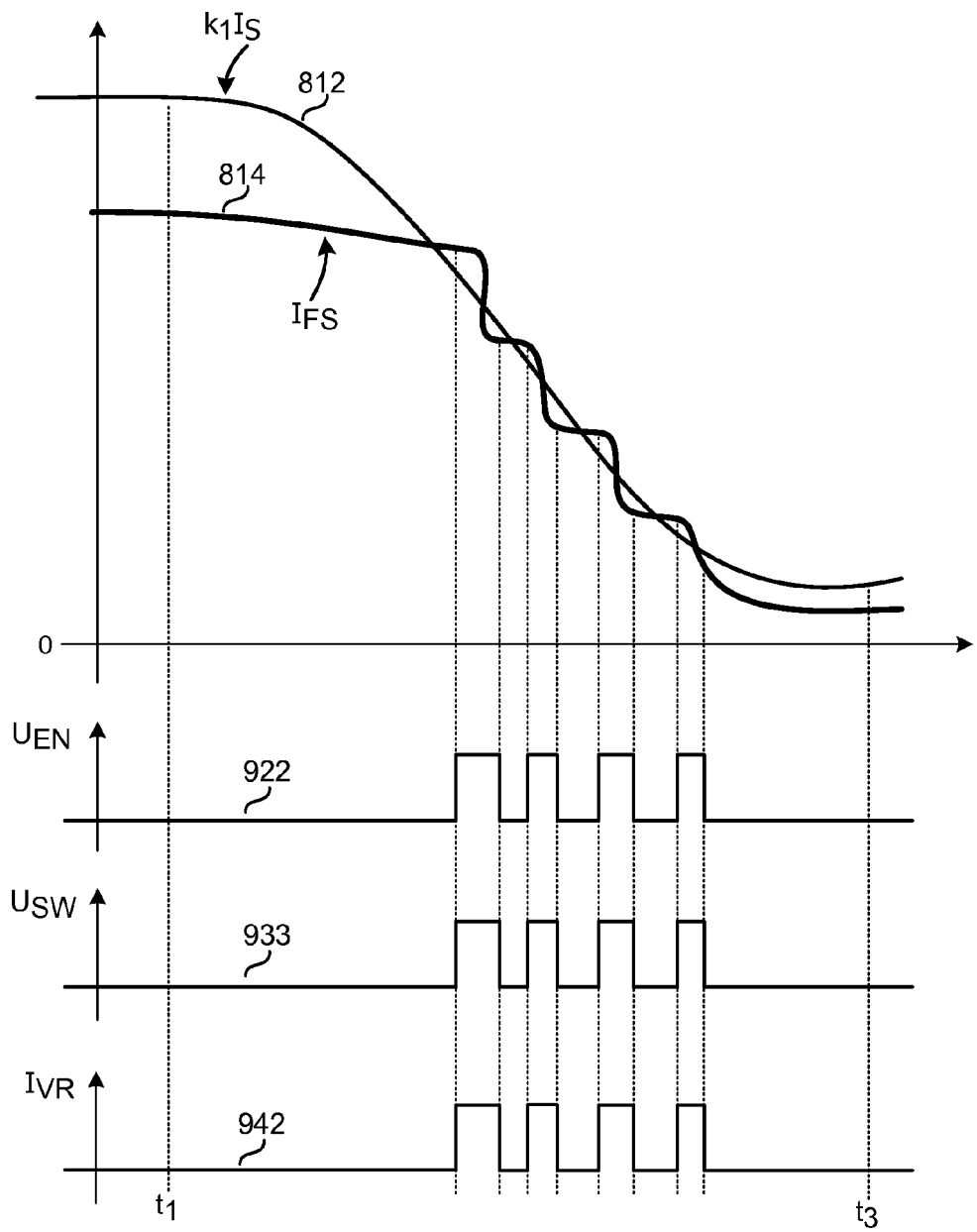
FIG. 9A gives an expanded view of a portion of some of the signals in FIG. 8A and shows an example timing diagram associated with various signals of the input control circuit of FIG. 5, in accordance with the teachings of the present disclosure.

FIG. 9A gives an expanded view of a portion of some of the signals in FIG. 8A and shows a corresponding timing diagram associated with various signals of the input control circuit of FIG. 5. Specifically, the timing diagram of FIG. 9A shows an example waveform 922 corresponding to enable signal $U_{EN}$ 522 (also referred to as an event detection signal), an example waveform 933 corresponding to switching signal $U_{SW}$ 733, and an example waveform 942 corresponding to current $I_{VR}$ 122, in accordance with the teachings of the present disclosure. These waveforms illustrate the operation of input control circuit 430 when input current $I_S$ 702 (representative of input current $I_{IN}$ 104) is dropping. As previously mentioned, if input current $I_{IN}$ 104 drops too quickly (i.e., the rate of drop reaches the threshold rate), controller 140 may not prevent input current $I_{IN}$ 104 from dropping below the latching current and/or the holding current. FIG. 9A shows how embodiments of the disclosure can reduce the rate of drop of input current $I_{IN}$ 104 in order to help prevent input current $I_{IN}$ 104 from dipping below the latching current and/or the holding current.

When waveform 802 begins to drop quickly, waveform 812 also drops quickly, as it is a scaled version of waveform 802. Waveform 814 is slower to respond to the drop of waveform 802 and crosses waveform 812, which causes waveform 922 to be asserted (digital high value). A digital high value in waveform 922 closes switch S1 534. Closing switch $S_1$ couples current source 532 to output terminal 144, which increases current $I_{VR}$ 122 conducted by variable current circuit 120. This increases the total input current $I_{IN}$ 104 that is being drawn from dimmer circuit 102 and slows the undesirably fast drop of input current $I_{IN}$ 104. A digital high value in waveform 922 also closes switch $S_2$ 734. Closing switch $S_2$ 734 increases the cut-off frequency of adjustable low-pass filter 740, which causes waveform 814 to increase in slope, and as a result, steers waveform 814 back toward waveform 812, in FIG. 9A. Once waveform 814 drops below waveform 812 again, waveform 922 goes low, which opens switches $S_1$ 534 and $S_2$ 734. Opening switch $S_1$ 534 reduces the current $I_{VR}$ 122 conducted by variable current circuit 120 and hence, reduces input current $I_{IN}$ 104. However, with the cut-off frequency of adjustable low-pass filter 740 decreased to its original cutoff frequency, waveform 814 rises above waveform 812 again causing switch $S_1$ 534 and $S_2$ 734 to close again. Therefore, the configuration of slope detection circuit 600/700 causes waveform 814 to track along waveform 812 and thereby modulating current $I_{VR}$ 122, when input current $I_{IN}$ 104 is dropping at a rate that is greater than or equal to the threshold rate.

Thus, to prevent the triac from turning off prematurely, when input current $I_{IN}$ 104 falls quickly enough, controller 140 can increase current $I_{VR}$ 122 conducted between terminals 111 and 113 in order to decrease the slope of input current $I_{IN}$ 104 and therefore, help prevent input current $I_{IN}$ 104 from dropping below the latching current and/or the holding current. Yet, when input current $I_{IN}$ 104 is no longer dropping at a rate that is greater than or equal to the threshold rate, controller 140 does not need to increase current $I_{VR}$ 122 to reduce the rate of drop of input current $I_{IN}$ 104. In this case, input control circuit 430 does not provide additional current to output terminal 144 to increase current $I_{VR}$ 122.

Referring back to FIG. 8A, waveform 814 tracks along waveform 812 between times t2 and t3 as the cut-off frequency of adjustable low-pass filter 740 keeps changing between the original cut-off frequency and a higher cut-off frequency, thereby steering waveform 814 below (at the higher cut-off frequency) and above waveform 812 (at the original cut-off frequency). This is necessary to ensure that controller 140 does not increase current $I_{VR}$ 122 to counteract the rate of change of input current $I_{IN}$ 104 when input current $I_{IN}$ 104 is not dropping at a rate greater than or equal to the threshold rate. For example, between times t2 and t4, had waveform 814 not been adjusted to track along waveform 812 and instead, been allowed to continue on its unadjusted waveform (illustrated by a dashed line), waveform 814 would have been above waveform 812 until time t4. In this case, controller 140 would increase current $I_{VR}$ 122 to reduce the rate of change of input current $I_{IN}$ 104 even though input current $I_{IN}$ 104 may not be dropping such as, for example, between time t3 and t4 when input current $I_{IN}$ 104, as illustrated by waveform 802, is rising.

Figure 8B:
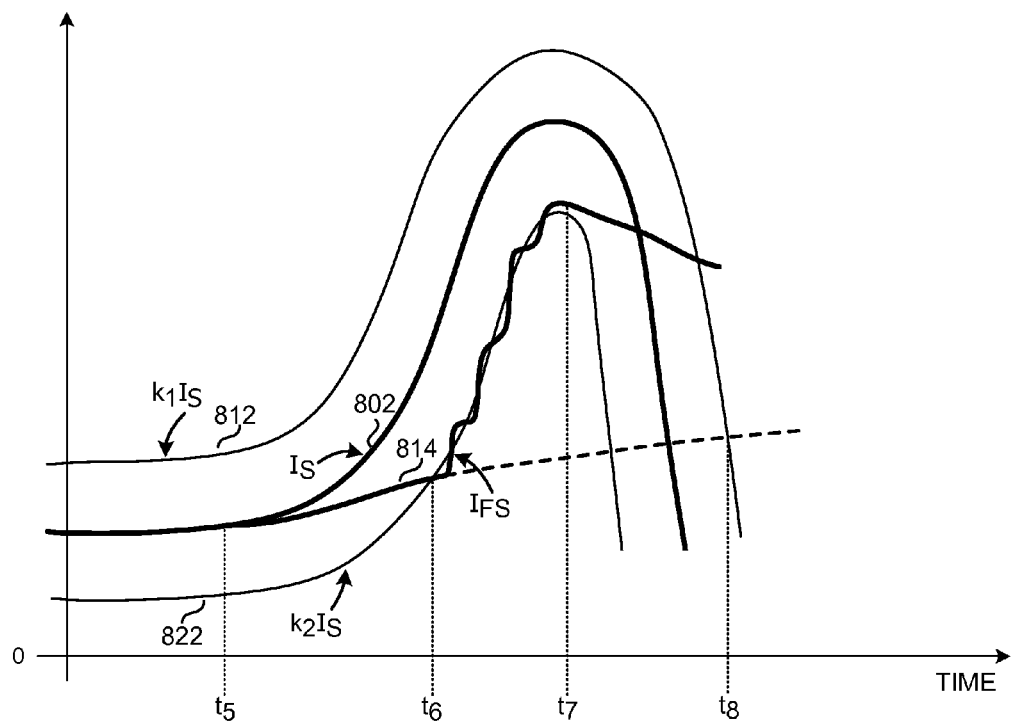

FIG. 8B shows example waveforms for various signals that are associated with the slope detection circuit illustrated in FIG. 7. Waveform 802, 812, 814, and 822 in FIG. 8B are similar to those in FIG. 8A except that they illustrate the operation of slope detection circuit 700 when input current $I_S$ 702 is rising quickly. As shown, waveform 802 begins to rise at time t5. Waveform 814 also begins to rise but at a lower rate of change (slope) due to adjustable low-pass filter 740 reducing higher frequency components in filtered current $I_{FS}$ 714. Waveform 814 reaches waveform 822 at time t6, causing switch $S_2$ 734 to close. Subsequently, cutoff frequency of adjustable low-pass filter 740 increases which in turn allows waveform 814 to track waveform 802 more closely (and quickly). As further shown in FIG. 8A, waveform 814 has a noticeable change in slope shortly after crossing waveform 822. This noticeable change in slope is indicative of adjustable low-pass filter 740 increasing its cutoff frequency to a frequency that is several orders of magnitude higher (e.g., 100 times higher) than the original cut-off frequency, thereby increasing the magnitude of the slope of waveform 814. Soon after, waveform 814 rises above waveform 822, which returns the cutoff frequency of adjustable low-pass filter 740 to its original cutoff frequency (between 1.5 kHz and 15 kHz in some examples). Between times t6 and t7, waveform 814 crosses and recrosses waveform 822 as waveform 802 continues to rise until time t7. From thereon, waveform 802 no longer rises and thus, waveform 814 stays above waveform 822.

Figure 9B:
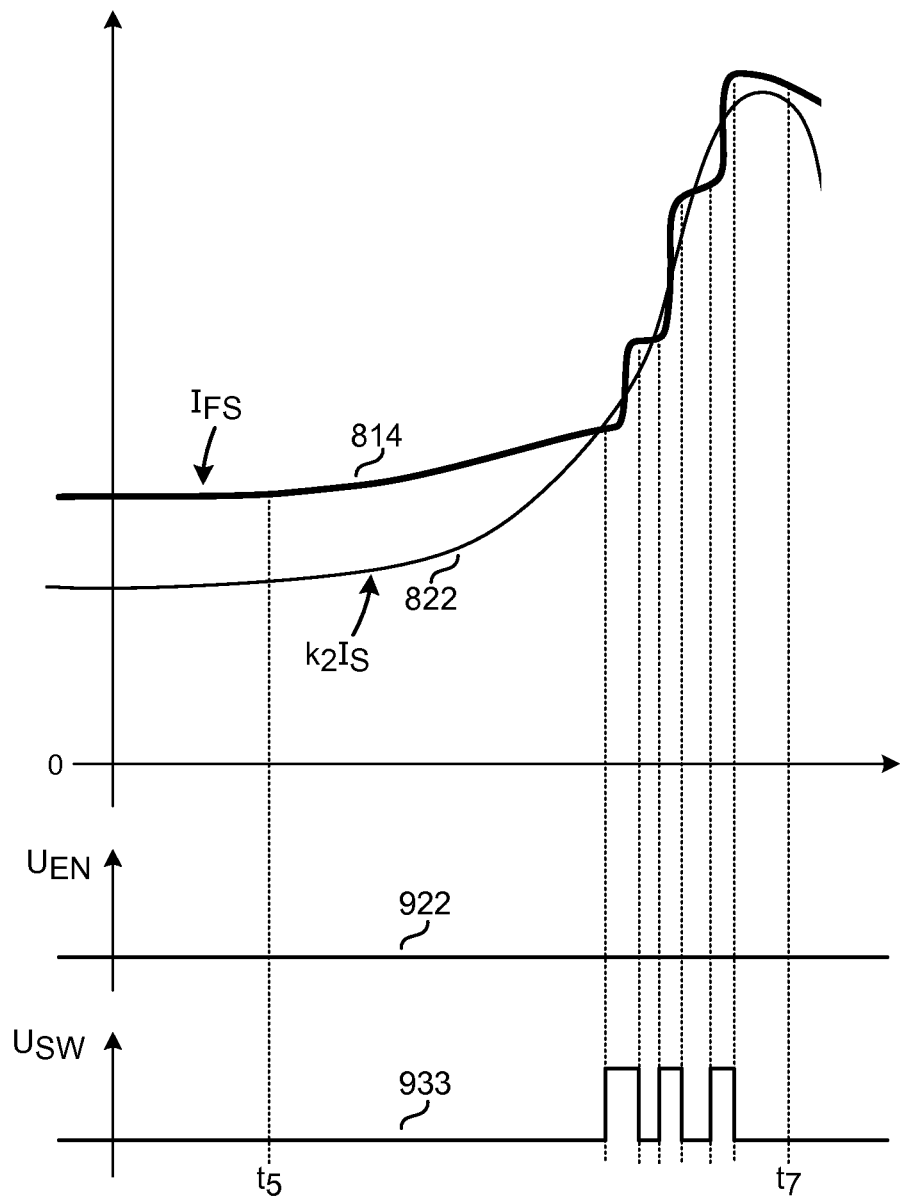
FIG. 9B gives an expanded view of a portion of some of the signals in FIG. 8B and shows another example timing diagram associated with various signals of the input control circuit of FIG. 5, in accordance with the teachings of the present disclosure.

FIG. 9B gives an expanded view of a portion of some of the signals in FIG. 8B and shows a corresponding timing diagram associated with various signals of the input control circuit of FIG. 5. Waveforms 922 and 933 in FIG. 9B illustrate the operation of input control circuit 430 when input current $I_S$ 702 (representative of input current $I_{IN}$ 104) is rising. When waveform 802 begins to rise quickly, waveform 822 also rises quickly, as it is a scaled version of waveform 802. Waveform 814 is slower to respond to the rise of waveform 802 and crosses waveform 822, causing the voltage on node A to reach a threshold that transitions waveform 933 to logic high as shown. Notably, FIG. 9B shows that waveform 922 is not asserted when waveform 802 rises quickly. Rather, waveform 922 is asserted in FIG. 9A, when waveform 802 is dropping for the purposes of keeping the input current $I_{IN}$ 104 above the latching and/or holding currents of dimmer circuit 102. However, that is less of a concern when input current IIN 104 is rising. Hence, waveform 922 is not asserted and switch $S_1$ 534 remains open and current source 532 remains decoupled from output terminal 144. As such, input control circuit 430 does not provide additional current to output terminal 144 to increase current $I_{VR}$ 122 when input current $I_{IN}$ 104 is rising.

Although lower reference generator 720 does not directly initiate additional current $I_{VR}$ 122 through variable current circuit 120, lower reference generator 720 makes slope detection circuit 700 more responsive to drops in input current $I_{IN}$ 104 by pre-positioning filtered current $I_{FS}$ 714 to encounter upper reference current 712 when input current $I_{IN}$ 104 does drop. FIG. 8B illustrates that when waveform 802 (hence, input current $I_{IN}$ 104) rises, lower reference generator 720 (with the help of logic circuit 730 and adjustable low-pass filter 740) causes waveform 814 to track waveform 822 rather than continuing on its unadjusted waveform (illustrated by a dashed line) where filter 740 is not changing its cutoff frequency. By having waveform 814 track waveform 822 when input current $I_{IN}$ 104 is rising, waveform 814 crosses waveform 812 sooner than it would have if it continued on its unadjusted waveform. And, as discussed above, when waveform 814 crosses waveform 812, controller 140 increases current $I_{VR}$ 122 to help maintain the holding and/or latching currents of dimmer circuit 102. Hence, lower reference generator 720 assists in shortening the response time of input control circuit 430 to a dropping input current $I_{IN}$ 104.

Examples of this disclosure include a bleeder controller (e.g. controller 140) for controlling a magnitude of a variable current (e.g. current 122) conducted by bleeder circuitry (e.g. variable current circuit 120) between input terminals of a device. The magnitude of the variable current is controllable in response to a control signal (e.g. control signal 143). The bleeder controller includes a control signal output (e.g. terminal 144), an input current sense input, a low pass filter, a comparator, and control signal circuitry. The control signal output is to be coupled to the output of the control signal to the bleeder circuitry. The input current sense input is to be coupled to receive an input current sense signal representative of the current input into the input terminals of the device. The low pass filter is coupled to low pass filter the input current sense signal and output a filtered input current sense signal. The comparator (e.g. comparator 650 and/or logic 630) is to compare the filtered input current sense signal with a version of the input current sense signal and to react to higher frequency components in the version of the input current sense signal. The higher frequency components have been filtered from the filtered input current sense signal by the low pass filter. The control signal circuitry (e.g. 510 and 530) is to set the control signal that is output to the control signal output. The control signal circuitry is to set the control signal such that conduction of the variable current between the input terminals is responsive to the reaction to the higher frequency components by the comparator.

The bleeder controller may include adjustment circuitry (e.g. switch S2 734) for adjusting the filtered input current sense signal responsive to the reaction to the higher frequency components by the comparator.

The adjustment circuitry may include a low pass filter and logic circuitry to trigger adjustments of the low pass filter responsive to the reaction to the higher frequency components by the comparator. The adjustments triggered by the logic circuitry may increase a cut-off frequency of the low pass filter.

The comparator may compare the adjusted filtered input current sense signal with the version of the input current sense signal. The adjustment circuitry is to discontinue the adjustments responsive to the comparison of the adjusted filtered input current sense signal with the version of the input current sense signal.

In some examples, the bleeder circuitry includes a current amplifier and the control signal includes a current to be input into the control terminal of the current amplifier. In some examples, the bleeder controller further includes scaling circuitry to scale the input current sense signal and the version of the input current sense signal is a scaled version of the input current sense signal.

In some examples, the bleeder controller includes a second low pass filter to filter the input current sense signal. The low pass filter has a lower cutoff frequency than the second low pass filter. The version of the input current sense signal is a low pass filtered version of the input current sense signal.

In some examples, the bleeder controller includes a second comparator to compare the filtered input current sense signal with a second version of the input current sense signal to react to higher frequency components in the second version of the input current sense signal. The higher frequency components have been filtered from the filtered input current sense signal by the low pass filter.

In some examples, the second comparator is coupled to identify rising transients of the second version of the input current sense signal and the comparator is coupled to identify falling transients of the version of the input current sense signal.

In some examples, the bleeder controller includes adjustment circuitry for adjusting the filtered input current sense signal responsive to the reaction to the higher frequency components by the second comparator. The adjustment circuitry may include a low pass filter and logic circuitry to trigger adjustments of the low pass filter responsive to the reaction to the higher frequency components by the second comparator. The adjustments triggered by the logic circuitry may increase a cut-off frequency of the low pass filter.

In some examples, the second comparator is coupled to compare the adjusted filtered input current sense signal with the second version of the input current sense signal and the adjustment circuitry is coupled to discontinue the adjustments responsive to the comparison of the adjusted filtered input current sense signal with the second version of the input current sense signal.

In some examples, the logic circuitry comprises an OR-gate for triggering adjustments to the filtered input current sense signal responsive to reaction to higher frequency components by either the comparator or the second comparator. The variable current circuit controller may include an input voltage sense input to be coupled to receive an input voltage sense signal representative of the input voltage of the power converter and control signal adjustment circuitry coupled to adjust the control signal responsive to the input voltage sense signal.

The bleeder controller may be coupled to control bleeder circuitry to conduct the variable current between input terminals of a device. The magnitude of the variable current is controllable in response to a control signal.

The bleeder controller may be included in a controller for a switch mode power converter. The switch mode power converter may be coupled to drive light emitting diode(s).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A transient event detector to detect whether a magnitude of a slope of an input current signal exceeds a slope threshold, the transient event detector comprising:
   a first reference generator coupled to scale the input current signal to generate a first reference current signal that tracks the input current signal;
   an adjustable low-pass filter circuit coupled to receive the input current signal and to generate a filtered input current signal in response thereto, wherein the adjustable low-pass filter circuit has a cutoff frequency such that a magnitude of a slope of the filtered input current signal is less than the magnitude of the slope of the input current signal during a transient event; and
   a first comparator coupled to generate an event detection signal that indicates the presence of the transient event in response to a value of the filtered input current signal reaching a value of the first reference current signal, wherein the adjustable low-pass filter circuit is configured to increase the cutoff frequency in response to the event detection signal indicating the presence of the transient event to increase the magnitude of the slope of the filtered input current signal.

2. The transient event detector of claim 1, wherein the first reference generator is coupled to generate the first reference current signal that is greater than and tracks the input current signal, and wherein the first comparator generates the event detection signal in response to the filtered input current signal exceeding the first reference current signal.

3. The transient event detector of claim 2, wherein the first reference generator comprises a first current amplifier having a gain greater than one coupled to receive the input current signal and to generate the first reference current signal that is greater than and tracks the input current signal.

4. The transient event detector of claim 2, further comprising:
   a second reference generator coupled to scale the input current signal to generate a second reference current signal that is less than and tracks the input current signal; and
   a second comparator coupled to compare the input current signal with the second reference current signal, wherein the adjustable low-pass filter circuit is further configured to increase the cutoff frequency in response to the second comparator indicating that the filtered input current signal is less than the second reference current signal.

5. The transient event detector of claim 4, wherein the second reference generator comprises a second current amplifier having a gain less than one coupled to receive the input current signal and to generate the second reference current signal that is less than and tracks the input current signal.

6. The transient event detector of claim 1, wherein the first comparator comprises:
   a logic gate coupled to generate the event detection signal having logic states; and
   a first node coupled to an input of the logic gate and coupled to receive the filtered input current signal and the first reference current signal such that a voltage level at the first node reaches a threshold voltage level to change a logic state of event detection signal in response to the filtered input current signal exceeding the first reference current signal.

7. The transient event detector of claim 1, wherein the adjustable low-pass filter circuit comprises a resistor-capacitor (RC) network coupled to receive the input current signal and to generate the filtered input current signal in response thereto, and wherein the adjustable low-pass filter circuit is configured to adjust a value of at least one component included in the RC network to increase the cutoff frequency when the event detection signal indicates the presence of the transient event.

8. The transient event detector of claim 7, wherein the adjustable low-pass filter circuit further includes a switch coupled to decrease a resistance value of the at least one component included in the RC network to increase the cutoff frequency in response to the event detection signal.

9. An input control circuit for use in a controller of a power converter that includes a variable current circuit coupled to conduct a variable current between input terminals of the power converter, the input control circuit comprising:
- a current source coupled to selectively provide an analog current signal to the variable current circuit in response to an enable signal; and
- a transient event detector coupled to receive an input current signal representative of a current that is input to the input terminals of the power converter and to generate the enable signal in response to a magnitude of a slope of the input current signal exceeding a slope threshold, wherein the variable current circuit is configured to increase the variable current in response to the analog current signal to reduce the magnitude of the slope of the input current signal, wherein the transient event detector comprises:
    - a first reference generator coupled to scale the input current signal to generate a first reference current signal that tracks the input current signal;
    - an adjustable low-pass filter circuit coupled to receive the input current signal and to generate a filtered input current signal in response thereto, wherein the adjustable low-pass filter circuit has a cutoff frequency such that a magnitude of a slope of the filtered input current signal is less than the magnitude of the slope of the input current signal during a transient event; and
    - a first comparator coupled to generate the enable signal in response to a value of the filtered input current signal reaching a value of the first reference current signal, wherein the adjustable low-pass filter circuit is configured to increase the cutoff frequency in response to the enable signal to increase the magnitude of the slope of the filtered input current signal.

10. The input control circuit of claim 9, wherein the first reference generator is coupled to generate the first reference current signal that is greater than and tracks the input current signal, and wherein the first comparator generates an event detection signal in response to the filtered input current signal exceeding the first reference current signal.

11. The input control circuit of claim 10, wherein the first reference generator comprises a first current amplifier having a gain greater than one coupled to receive the input current signal and to generate the first reference current signal that is greater than and tracks the input current signal.

12. The input control circuit of claim 10, wherein the transient event detector further comprises:
- a second reference generator coupled to scale the input current signal to generate a second reference current signal that is less than and tracks the input current signal; and
- a second comparator coupled to compare the input current signal with the second reference current signal, wherein the adjustable low-pass filter circuit is further configured to increase the cutoff frequency in response to the second comparator indicating that the filtered input current signal is less than the second reference current signal.

13. The input control circuit of claim 12, wherein the second reference generator comprises a second current amplifier having a gain less than one coupled to receive the input current signal and to generate the second reference current signal that is less than and tracks the input current signal.

14. The input control circuit of claim 9, wherein the first comparator comprises:
- a logic gate coupled to generate the event detection signal having logic states; and
- a first node coupled to an input of the logic gate and coupled to receive the filtered input current signal and the first reference current signal such that a voltage level at the first node reaches a threshold voltage level to change a logic state of event detection signal in response to the filtered input current signal exceeding the first reference current signal.

15. The input control circuit of claim 9, wherein the adjustable low-pass filter circuit comprises a resistor-capacitor (RC) network coupled to receive the input current signal and to generate the filtered input current signal in response thereto, and wherein the adjustable low-pass filter circuit is configured to adjust a value of at least one component included in the RC network to increase the cutoff frequency when the event detection signal indicates the presence of the transient event.

16. The input control circuit of claim 15, wherein the adjustable low-pass filter circuit further includes a switch coupled to decrease a resistance value of the at least one component included in the RC network to increase the cutoff frequency in response to the event detection signal.

17. A power converter, comprising:
- a variable current circuit coupled to conduct a variable current between input terminals of the power converter;
- a controller coupled to the variable current circuit, the controller including:
    - a current source coupled to selectively provide an analog current signal to the variable current circuit in response to an enable signal; and
    - a transient event detector coupled to receive an input current signal representative of current that is input to the input terminals of the power converter and to generate the enable signal in response to a magnitude of a slope of the input current signal exceeding a slope threshold, wherein the variable current circuit is configured to increase the variable current in response to the analog current signal to reduce the magnitude of the slope of the input current signal;
- an energy transfer element coupled between an input and an output of the power converter; and
- a power switch coupled to the energy transfer element, wherein the controller further comprises a drive signal generator to generate a drive signal to control switching of the power switch to control a transfer of energy across the energy transfer element from the input to the output of the power converter.

18. The power converter of claim 17, wherein the transient event detector comprises:
- a first reference generator coupled to scale the input current signal to generate a first reference current signal that tracks the input current signal;
- an adjustable low-pass filter circuit coupled to receive the input current signal and to generate a filtered input current signal in response thereto, wherein the adjustable low-pass filter circuit has a cutoff frequency such that a magnitude of a slope of the filtered input current signal is less than the magnitude of the slope of the input current signal during a transient event; and
- a first comparator coupled to generate the enable signal in response to a value of the filtered input current signal reaching a value of the first reference current signal, wherein the adjustable low-pass filter circuit is configured to increase the cutoff frequency in response to the enable signal to increase the magnitude of the slope of the filtered input current signal.

19. A bleeder controller for controlling a magnitude of a variable current conducted by bleeder circuitry between input terminals of a device, wherein the magnitude of the variable current is controllable in response to a control signal, the bleeder controller comprising:
   a control signal output to be coupled to output the control signal to the bleeder circuitry;
   an input current sense input to be coupled to receive an input current sense signal representative of the current input into the input terminals of the device;
   a low pass filter to low pass filter the input current sense signal and output a filtered input current sense signal;
   a comparator to compare the filtered input current sense signal with a version of the input current sense signal and to react to higher frequency components in the version of the input current sense signal, wherein the higher frequency components have been filtered from the filtered input current sense signal by the low pass filter; and
   control signal circuitry to set the control signal that is output to the control signal output, the control signal circuitry to set the control signal such that conduction of the variable current between the input terminals is responsive to the reaction to the higher frequency components by the comparator.

20. The bleeder controller of claim 19, further comprising adjustment circuitry for adjusting the filtered input current sense signal responsive to the reaction to the higher frequency components by the comparator.

21. The bleeder controller of claim 20, wherein the adjustment circuitry comprises:
   the low pass filter; and
   logic circuitry to trigger adjustments of the low pass filter responsive to the reaction to the higher frequency components by the comparator.

22. The bleeder controller of claim 21, wherein the adjustments triggered by the logic circuitry increase a cut-off frequency of the low pass filter.

* * * * *